United States Patent
Wada

(10) Patent No.: US 8,209,234 B2
(45) Date of Patent: Jun. 26, 2012

(54) SPECTACLE LENS SELECTION SYSTEM AND SPECTACLE LENS SELECTION METHOD

(75) Inventor: Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/088,204

(22) Filed: Apr. 15, 2011

(65) Prior Publication Data

US 2011/0258071 A1    Oct. 20, 2011

(30) Foreign Application Priority Data

Apr. 16, 2010 (JP) ................................. 2010-094768

(51) Int. Cl.
*G06Q 30/00* (2006.01)
(52) U.S. Cl. ...................................................... 705/26.1
(58) Field of Classification Search .................. 705/26.1
See application file for complete search history.

(56) References Cited

U.S. PATENT DOCUMENTS

2004/0032565 A1* 2/2004 Yamakaji et al. ............. 351/177
2007/0118428 A1  5/2007 Akiyama et al. ................ 705/26

FOREIGN PATENT DOCUMENTS

WO    WO 2005/092173 A1   10/2005

OTHER PUBLICATIONS

Eyeing Up a Bargain; Ninness, Greg; Sunday Star—Times. Wellington, New Zealand: Sep 23, 2007. p. D.6; http://proquest.umi.com/pqdweb?did=1341346521&sid=2&Fmt=3&clientId=19649&RQT=309&VName=PQD.*

* cited by examiner

*Primary Examiner* — Mila Airapetian
(74) *Attorney, Agent, or Firm* — DLA Piper LLP (US)

(57) ABSTRACT

A spectacle lens selection system includes a manufacturer side terminal and a store side terminals installed in a store and is connected to the manufacturer side terminal via a network. The store side terminal transmits a wearing condition parameters including a downward rolling length of eyes and a lateral gaze length of a spectacle wearer to the manufacturer side terminal, and the manufacturer side terminal selects a most suitable product based on the wearing condition parameters, and transmits the result to the store side terminal.

3 Claims, 8 Drawing Sheets

INPUT DATA LIST

| STORE INFORMATION | | |
|---|---|---|
| STORE NAME | CUSTOMER NAME | RECORD NUMBER |
| A STORE | TARO INA | 1831 |

| ITEM | PRESCRIPTION DATA | | FRAME DATA | | FITTING DATA | |
|---|---|---|---|---|---|---|
| | R | L | MANUFACTURER | B CORPORATION | WEARING DISTANCE | 12 |
| SPHERICAL POWER | -3.00 | -3.25 | TYPE | METAL | FORWARD TILT ANGLE | 10 |
| CYLINDRICAL POWER | -1.00 | -0.75 | LENS SHAPE WIDTH | 51 | AMOUNT OF DOWNWARD ROLLING OF THE EYES | 13.5 |
| CYLINDER AXIS | 180 | 175 | NOSE WIDTH | 19 | AMOUNT OF LATERAL GAZE | 10 |
| PRISM | 0.5 △ BI | 0.5 △ BU | VERTICAL WIDTH | 35 | DISTANCE EP HEIGHT | 20 |
| DISTANCE PD | 32 | 32 | TEMPLE LENGTH | 140 | DOMINANT EYE | R |
| ADDITIONAL POWER | 2.00 | 2.00 | | | | |

| ITEM | DISTANCE-NEAR CASE | INTERMEDIATE-NEAR, NEAR-NEAR CASE | ITEM | BASIC DATA |
|---|---|---|---|---|
| NEAR PURPOSE DISTANCE(cm) | 40 | | AGE | 52 YEARS OLD |
| DISTANCE PURPOSE DISTANCE(cm) | | 50 | WEARING HISTORY | 5 YEARS |
| NEAR PURPOSE DISTANCE(cm) | | 40 | PRICE IDEA | 50,000YEN |

TRANSMISSION — 31

FIG. 5

SPECTACLE LENS SELECTION SYSTEM AND SPECTACLE LENS SELECTION METHOD

BACKGROUND

1. Technical Field

The present invention relates to a spectacle lens selection system and a spectacle lens selection method for selecting spectacle lenses the most suitable for an individual.

2. Related Art

As the spectacle lens there can be cited progressive-power lens beside the single focus lens. The progressive-power lens has a distance-portion area having the refractivity (dioptric power) dealing with the distance vision on the upper portion and a near-portion area having the refractivity dealing with the near vision below the distance-portion area. Further, the progressive-power lens has a progressive band with the refractivity varying continuously and an area called a "lateral portion" or a "peripheral portion" between the distance-portion area and the near-portion area. As described above, since the progressive-power lens has the refractivity different between the viewpoints on the lens, an amount of downward rolling of the eyes and an amount of lateral gaze of an individual become important when performing the lens design. Here, the amount of downward rolling of the eyes (the downward rolling length) denotes the vertical distance from the point on the lens through which the line of sight passes when the spectacle wearer is in the distance vision state in the natural state to the point on the lens through which the line of sight passes when the spectacle wearer is in the near vision state. Further, the amount of lateral gaze (the lateral gaze length) denotes the horizontal distance from the point on the lens through which the line of sight passes when the spectacle wearer is in the distance vision state to the point on the lens through which the line of sight passes when the spectacle wearer is in the lateral gaze state.

When performing spectacle adjustment on a spectacle wearer, engineering fitting for adapting the spectacle information (optometry information, frame information, spectacle lens information) to the individual (e.g., the figure and the size of the face, the thickness of the neck, the posture, the relative positions and the shapes of the nose, the ear, and the eyes) is performed. Further, in the case of the progressive-power lens, there are performed measurement of the amount of downward rolling of the eyes and the amount of lateral gaze, and optical fitting for performing fitting to the individual purpose of use (e.g., stressing distance-near vision, stressing intermediate-near vision, stressing near-near vision, full-time use, part-time use, static use, and dynamic use) besides the engineering fitting.

In the past, there has been proposed a system for supplying a pair of spectacles based on the spectacle wearing parameters obtained by such fitting (e.g., WO 2005/092173 (Document 1)).

According to Document 1, the spectacle wearing parameters measured by the spectacle wearing parameter measurement device are transmitted from the ordering side computer to the manufacturing side computer, and the manufacturing side computer performs the optical design based on the spectacle wearing parameter thus received, and manufactures the spectacle lenses based on the design values.

However, in Document 1, the spectacle wearing parameters necessary for spectacle adjustment are limited to the distance vision pupillary distance, the near vision pupillary distance: the distance vision spectacle wearing distance, the near vision spectacle wearing distance, the frame wearing angle, the eyeball convolution angle, and the near vision object distance, and the amount of downward rolling of the eyes and the amount of lateral gaze necessary for the optical design of the progressive-power lens are not included. Therefore, it is difficult for the system described in Document 1 to design the spectacle lenses the most suitable for the spectacle wearer using the progressive-power lenses.

SUMMARY

An advantage of some aspects of the invention is to provide a spectacle lens selection system and a spectacle lens selection method for selecting spectacle lenses more comfortable for spectacle wearers.

According to an aspect of the invention, a spectacle lens selection system including a store side terminal installed in a store including a spectacle store, and a manufacturer side terminal installed in a lens manufacturer connected to the store side terminal via a network, the manufacturer side terminal includes a profile storage section that stores a profile that represents characteristics of a progressive-power lens product in relation to the product, a lens selection section that selects a most suitable product from the profile storage section based on wearing condition parameters including a downward rolling length of eyes and a lateral gaze length of a spectacle wearer received from the store side terminal, and an analysis result transmission section that obtains an information related to the most suitable product selected from the profile storage section and transmits the information to the store side terminal as an analysis result, and the store side terminal includes an input section that is capable of inputting customer information on the spectacle wearer and the wearing condition parameters, a data transmitter section that transmits the customer information input and the wearing condition parameters to the manufacturer side terminal, and an analysis result processing section that obtains the analysis result from the manufacturer side terminal and outputs the analysis result.

According to this aspect of the invention, since the store side terminal and the manufacturer side terminal are connected to each other via a network, the wearing condition parameters of the customer can be transmitted from the store side terminal to the manufacturer side terminal to thereby perform detailed lens design (analysis) based on the wearing condition parameters received in the manufacturer side terminal. In particular, regarding the progressive-power lens, although it is difficult to provide a lens the most suitable for the individual, according to this aspect of the invention the wearing condition parameters including the amount of downward rolling of the eyes and the amount of lateral gaze important for the lens design of the progressive-power lenses are transmitted from the store side terminal to the manufacturer side terminal. Therefore, the manufacturer side terminal can select the spectacle lenses more comfortable to the customer based on the wearing condition parameters including the amount of downward rolling of the eyes and the amount of lateral gaze. It should be noted that the information related to the product of the spectacle lens is previously stored in the profile storage section, and can be selected from the products stored in the profile storage section.

Further, the information of the spectacle lens thus selected is transmitted to the store side terminal as the analysis result data, and is output to the store side terminal. Specifically, in the spectacle store, the analysis result with respect to the wearing condition parameters transmitted to the manufacturer side is transmitted thereto. Since the terminals are connected via the network, the communication is performed in a short period of time, and therefore, the analysis result can promptly be obtained. Therefore, the spectacle lens most suitable for the customer can promptly be presented, and at the same time, since the analysis result by the lens manufacturer can easily satisfy the customer, the communication can be enhanced.

As described above, since the cooperation between the spectacle store, the lens manufacturer, and the customer becomes easy, it is possible to provide the customer with a wide variety of services.

In the spectacle lens selection system of the above aspect of the invention, it is preferable that the store side terminal further includes a simulation section that simulates a vision of the spectacle wearer when the spectacle wearer wear the product selected based on the analysis result, and outputs the a simulation result.

According to this configuration, it is possible to present the vision of the wearer in the case of wearing the spectacle lenses selected based on the analysis result together with the analysis result of the wearing condition parameters to the customer who visits the spectacle store. Therefore, the customer can check the view of the spectacle lens determined as the optimum in the manufacturer in advance of the formal purchase order or the manufacture of the spectacle lenses. Since it is also possible to select another spectacle lens in case the customer feels uncomfortable with the vision by the simulation, waste in manufacture can be prevented from occurring. Therefore, cooperation between the lens manufacturer, the spectacle store, and the customer becomes easy in advance of the manufacture of the spectacle lenses, it becomes possible to provide the best suited spectacle lenses to the customer.

According to another aspect of the invention, a spectacle lens selection method includes: inputting a customer information on a spectacle wearer and a wearing condition parameters including a downward rolling length of eyes and a lateral gaze length to a store side terminal, transmitting the customer information and the wearing condition parameters from the store side terminal to a manufacturer side terminal, receiving the customer information and the wearing condition parameters by the manufacturer side terminal, selecting a most suitable product based on the wearing condition parameters, transmitting an information related to the product to the store side terminal as an analysis result.

According to this aspect of the invention, since the store side terminal and the manufacturer side terminal are connected to each other via a network, the wearing condition parameters of the customer can be transmitted from the store side terminal to the manufacturer side terminal to thereby perform detailed lens design (analysis) based on the wearing condition parameters received in the manufacturer side terminal. In particular, regarding the progressive-power lens, although it is difficult to provide a lens the most suitable for the individual, according to this aspect of the invention the wearing condition parameters including the amount of downward rolling of the eyes and the amount of lateral gaze important for the lens design of the progressive-power lenses are transmitted from the store side terminal to the manufacturer side terminal. Therefore, the manufacturer side terminal can select the spectacle lenses more comfortable to the customer based on the wearing condition parameters including the amount of downward rolling of the eyes and the amount of lateral gaze. It should be noted that the information related to the product of the spectacle lens is previously stored in the profile storage section, and can be selected from the products stored in the profile storage section.

Further, the information of the spectacle lens thus selected is transmitted to the store side terminal as the analysis result data, and is output to the store side terminal. Specifically, in the spectacle store, the analysis result with respect to the wearing condition parameters transmitted to the manufacturer side is transmitted thereto. Since the terminals are connected via the network, the communication is performed in a short period of time, and therefore, the analysis result can promptly be obtained. Therefore, the spectacle lens most suitable for the customer can promptly be presented, and at the same time, since the analysis result by the lens manufacturer can easily satisfy the customer, the communication can be enhanced.

As described above, since the cooperation between the spectacle store, the lens manufacturer, and the customer becomes easy, it is possible to provide the customer with a wide variety of services.

BRIEF DESCRIPTION OF THE DRAWINGS

The invention will be described with reference to the accompanying drawings, wherein like numbers reference like elements.

FIG. 5 is a schematic diagram of an input screen displayed on an output section of a store terminal in the embodiment.

DESCRIPTION OF AN EXEMPLARY EMBODIMENT

An embodiment of the invention will hereinafter be explained with reference to the accompanying drawings. In the present embodiment, a progressive-power lens is used as the spectacle lens.

1. SPECTACLE LENS

Figure 1:
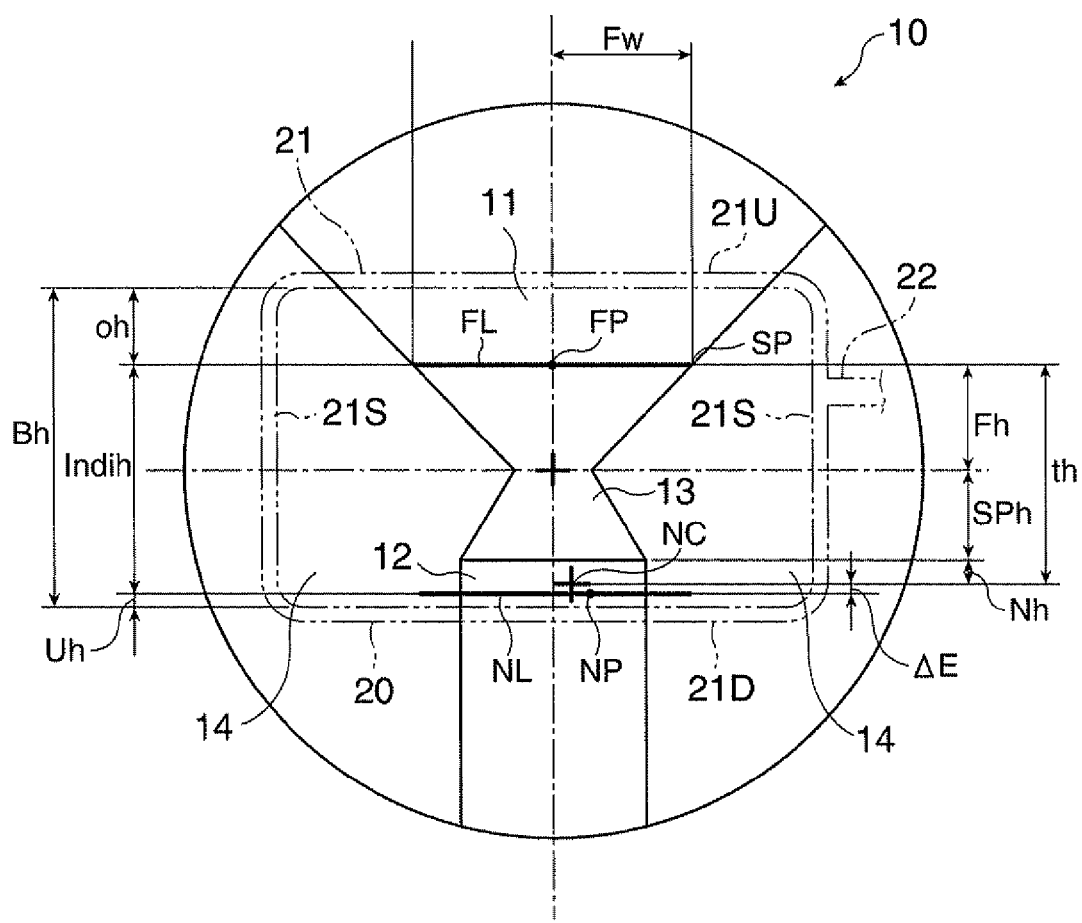
FIG. 1 is a schematic diagram of a progressive-power lens selected in the spectacle lens selection system according to an embodiment of the invention.

As shown in FIG. 1, the spectacle lens 10 has a distance portion area 11 located on the upper side, a near portion area 12 located on the lower side, a progressive band 13 located between the distance portion area 11 and the near portion area 12, and a lateral area 14 laterally adjacent to the progressive band 13.

The distance portion area 11 is provided with the average dioptric power with relatively weak positive dioptric power, which is suitable for distance vision. In particular, a point through which the horizontal line (i.e., the line of sight), which passes through the center of the pupil when the wearer views the distance in the front, passes is defined as a distance eye point FP. The distance eye point FP is located at the intersection between the line obtained by extending the geometric center of the spectacle lens vertically upward and the distance eye point line FL.

The near portion area 12 is provided with the average dioptric power with relatively strong positive dioptric power, which is suitable for near vision (e.g., reading). In particular, the point through which the line of sight of the wearer performing near vision (downward gaze) passes is defined as a near eye point NP.

The progressive band 13 is an area located between the distance portion area 11 and the near portion area 12, where the relatively positive average addition power varies progressively. The line passing through the distance eye point FP, and extending in the lateral direction is defined as a distance eye point line FL. The distance from the distance eye point FP to the boundary line between the distance portion area 11 and the lateral area 14 along the distance eye point line FL is defined as a one-side distinct vision width Fw.

The line passing through the near eye point NP, and extending in the lateral direction is defined as a near eye point line NL. The distance (length) between the distance eye point line FL and the near eye point line NL is the amount of downward rolling of the eyes Indih.

The distance from the boundary line between the distance portion area 11 and the progressive band 13 to the distance eye point FP corresponds to the distance eye point height Fh. The length (distance) from the boundary line between the distance portion area 11 and the progressive band 13 to the boundary line between the progressive band 13 and the near portion area 12 corresponds to the progressive band length SPh.

The length (distance) between the boundary line between the progressive band 13 to the near portion area 12 to the optical center NC of the near portion area 12 corresponds to the near portion section height Nh. The optical center NC of the near portion area 12 corresponds to the optical center when performing the optical design of the near portion area.

The lateral area 14 is an area called an astigmatic area. Since if the object is viewed through the lateral area 14, a double image of the object might be viewed, it is not usual that the wearer views the object through the lateral area 14.

The spectacle lenses 10 can be obtained by performing a mold process on such a progressive-power lens, and are attached to the frame 20 to thereby constitute the spectacles.

The frame 20 is provided with frame rims 21 which the spectacle lenses 10 are respectively attached to and are respectively surrounded by like rims, a bridge 22 for coupling the tight and left frame rims 21, and temples (not shown) attached to the respective frame rims 21 via hinges in a rotatable manner. The frame rims 21 are each provided with an upper side section 21U, a lower side section 21D, and lateral side sections 21S. The distance between the upper side section 21U and the lower side section 21D corresponds to the lens shape height Bh of the spectacle lens, and the distance from the distance eye point FP to the upper side section of the frame corresponds to the upper frame height Oh. The distance from the lower side section 21D of the frame rim 21 to the near eye point NP corresponds to the lower frame height Uh.

Further, the total of the distance eye point height Fh, the progressive band length SPh and the near portion height Nh is defined as the total length th.

2. CONFIGURATION OF SPECTACLE LENS SELECTION SYSTEM

Figure 2:
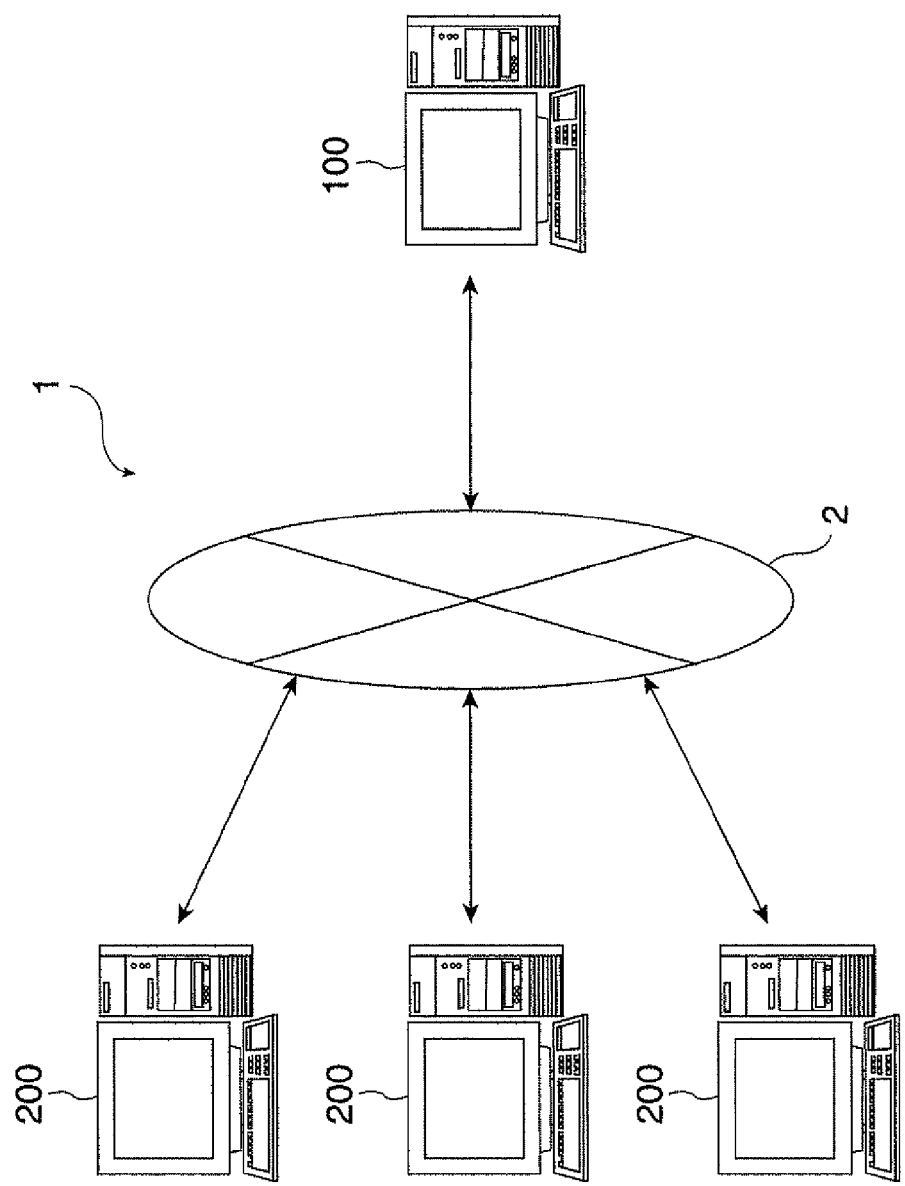
FIG. 2 is a communication line diagram showing the spectacle lens selection system according to the embodiment.

As shown in FIG. 2, the spectacle lens selection system 1 is provided with a manufacturer side terminal 100 installed in the lens manufacturer, and a plurality of store side terminals 200 installed in the respective spectacle stores or the like and connected to the manufacturer side terminal 100 via the Internet 2. The spectacle lens selection system 1 is the system in which the store side terminal 200 transmits the various parameters measured in the spectacle stores or the like to the manufacturer side terminal 100, and the manufacturer side terminal 100 analyzes the various parameters to select the most suitable lenses, and then transmits the result to the store side terminal 200.

The Internet 2 is a network based on the protocol such as Transmission Control Protocol/Internet Protocol (TCP/IP), but the system is not limited thereto. There can be used any configuration for communicating data such as an intranet such as a local area network (LAN) or a wide area network (WAN), a network such as a communication network or a broadcasting network constituted with a plurality of base stations capable of communicating information via a wireless medium, and further a wireless medium itself to be a medium for directly receiving data.

2-1. Configuration of Manufacturer Side Terminal

The manufacturer side terminal 100 is a terminal device provided with an arithmetic processing section, a storage section for storing a variety of data, an output section such as a display for outputting a variety of screens, and an input section such as a keyboard, and is networked to the store side terminals 200. As the manufacturer side terminal 100, a personal computer can be used, for example.

Figure 3:
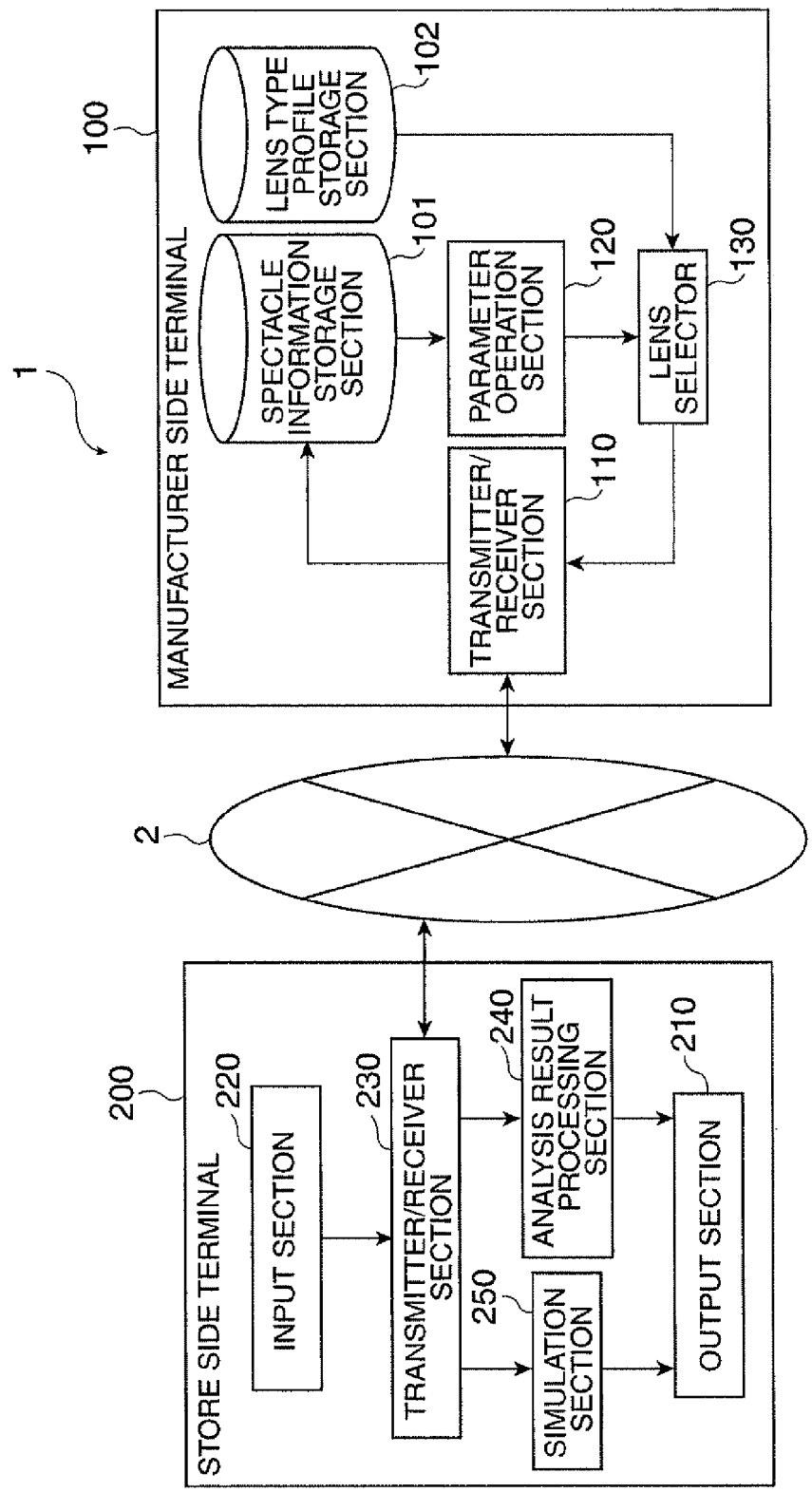
FIG. 3 is a block diagram showing the overall configuration of the spectacle lens selection system according to the embodiment.

As shown in FIG. 3, as the storage section there are provided a spectacle information storage section 101 to which various wearing condition parameters received from the store side terminal 200 are stored, and a lens type profile storage section 102 in which the profiles of the spectacle lenses are previously stored product by product. Further, although not shown in the drawings, there is also provided a storage section or the like for storing the program for the arithmetic processing section described later to execute various arithmetic calculation, namely the program describing the procedure of performing the arithmetic processing based on the wearing condition parameters, and then selecting the best suited spectacle lenses based on the calculation result.

The spectacle information storage section 101 has a table structure in which a customer and the spectacle information (the prescription data of the lenses, the frame data, the fitting data, and so on) of the customer are correlated with each other and stored as one record. As the spectacle information, there can be cited the frame data such as a manufacturer's name of the frame selected by the customer, a frame type, a lens shape width of the frame, the nose width of the frame, the vertical width Eh of the frame, and so on, the fitting data by the frame selected by the customer such as the height (distance EP height) FEPh of the distance eye point, the wearing distance, the forward tilt angle and so on, the amount of downward rolling of the eyes, the amount of lateral gaze, a dominant eye, and so on besides the prescription data of the lens such as spherical power, cylindrical power, a cylinder axis, prismatic power and base setting, additional power, distance PD, and so on.

The lens type profile storage section 102 is for storing prescribed lens design profiles, and stores profiles of the spectacle lenses provided by lens manufacturers product by product.

For example, progressive-power lenses include spectacle lenses stressing distance-near vision, stressing intermediate-near vision, and stressing near-near vision. Further, each of the groups has three types, namely A-type having a large distance portion area 11, B-type having an intermediate-sized distance portion area 11, and C-type having a narrow distance portion area 11. The lens type profile storage section 102 stores the lens design program and the basic information for designing the A-type, B-type, and C-type of each of the groups respectively stressing distance-near vision, stressing intermediate-near vision, and stressing near-near vision, as the respective product data.

It should be noted that the A-type spectacle lenses 10 have a larger distance portion area 11, but have large aberration of the lateral area 14, and are therefore unsuitable for the wearers first using the progressive-power spectacle lenses. The C-type spectacle lenses 10 have a small distance portion area 11, but have small aberration of the lateral area 14, and are therefore suitable for the wearers first using the progressive-power spectacle lenses. Further, the B-type spectacle lenses 10 have an intermediate-sized distance portion area 11, and positions at the middle of the A-type and the C-type.

The arithmetic processing section is a central processing unit (CPU) for performing the operation and processing of the information, and performs the overall control of the manufacturer side terminal 100. The arithmetic processing section appropriately retrieves and then executes the various programs stored in the storage section to thereby realize the various functions in cooperation with the hardware (the storage section, the output section, and the input section).

As shown in FIG. 3, the arithmetic processing section is provided with a transmitter/receiver section 110 for transmitting/receiving various data with the store side terminals 200, a parameter operation section 120 for calculating the various parameters based on the wearing condition parameters thus received, and a lens selector 130 for selecting appropriate spectacle lenses based on the various parameters thus calculated. It should be noted that the parameter operation section 120 and the lens selector 130 function as the lens selection section according to the aspect of the invention, and the transmitter/receiver section 110 has a function of the analysis result transmission section according to the aspect of the invention.

The transmitter/receiver section 110 receives the various wearing condition parameters transmitted from the store side terminal 200, and then transmits the analysis result data of the spectacle lens selected by the parameter operation section 120 and the lens selector 130 to the store side terminal 200. Further, the transmitter/receiver section 110 stores the various wearing condition parameters received from the store side terminal 200 into the spectacle information storage section 101.

The parameter operation section 120 carries out an operation on various parameters necessary for selecting the spectacle lens based on the wearing condition parameters stored in the spectacle information storage section 101.

Firstly, the progressive band length SPh is obtained based on the amount of downward rolling of the eyes thus received.

Specifically, the lens profile is generated with an arbitrary progressive band length SPh within the specification range of the lens design type (e.g., C-type) with the smallest aberration amount of the lateral area 14 based on the lens prescription data of the both eyes out of the various data transmitted from the store side terminal 200.

Subsequently, the distance eye point FP is temporarily set on the line obtained by extending the geometric center of the spectacle lens vertically upward in the lens profile thus generated, then the one side distinct vision width Fw to the point at which the amount of astigmatism of the distance portion area 11 falls within the acceptable range is obtained with respect to the four parameters, the nose side and the ear side of the lenses of the both eyes, then the distance eye point height Fh of the distance portion area 11 when the one side distinct vision width Fw matches the amount of lateral gaze is obtained with respect to the four data, and then the largest distance eye point height Fh of the distance portion area 11 is obtained from the four data.

Subsequently, $\Delta E$ is obtained from the formulas (1), (2) described below based on the amount of downward rolling of the eyes Indih, the largest distance eye point height Fh of the distance portion area 11, the longest progressive band length SPh, and the near eye point height Nh of the near portion area 12 (see FIG. 1). It should be noted that the eye point height Nh of the near portion area is arbitrarily determined in the lens profile generated.

Subsequently, $\Delta E$ is determined using the discriminant (3). If the determination result of $\Delta E$ is within the range of the discriminant (3), the progressive band length SPh used at that moment is determined as the optimum progressive band length. If the determination result of $\Delta E$ proceeds the range out on the positive side, the lens profile with the arbitrary progressive band length SPh elongated is newly generated, which is repeated until $\Delta E$ converges in the discriminant (3). Further, if the determination result of $\Delta E$ proceeds the range out on the negative side, the lens profile with the arbitrary progressive band length SPh shortened is newly generated, which is similarly repeated until $\Delta E$ converges in the discriminant (3). It should be noted that if all of the cases fail to converge in the discriminant (3), the lens design type is changed to one (e.g., the B-type) with the second smallest aberration amount of the lateral area 14, and substantially the same process is repeated.

Here, the range of the discriminant (3) is assumed to be $0 \leq \Delta E \leq 2$, the range is not limited thereto. Further, the longest one of the distance eye point height Fh of the distance portion area 11 out of the four data described above is used for the discriminant in the method of obtaining the distance eye point height Fh of the distance portion area 11, the method is not limited thereto. For example, the largest distance eye point height Fh of the distance portion area 11 out of the lens profiles used for the dominant eye can also be used.

Subsequently, whether or not the upper frame height Oh of the distance portion area 11 is appropriate with respect to the frame selected by the customer is determined. The upper frame height Oh of the distance portion area 11 of the frame can be obtained from the formula (4) described below using the vertical width (the lens shape height Bh of the spectacle lens) of the frame selected by the customer, and the distance eye point height FEPh with respect to the frame selected by the customer out of the various data transmitted from the store side terminal 200. Subsequently, Oh is determined using the discriminant (5). If the determination result complies with the discriminant (5), the frame vertical width Bh selected by the customer is determined. If the determination result does not comply with the discriminant (5), the amount of shortage $\Delta$Oh of the frame vertical width Bh selected by the customer is obtained from the formula (6) below. In the formula (6), Oh_r is the value necessary for the distance portion area 11 to cover the effective visual field area, and is 9 mm, for example.

It should be noted that although the range of the discriminant (5) is assumed to be $9 \leq Oh$, the range is not a limitation. Since the effective visual field (the range in which the visual information is used effectively) of a human is generally assumed to be not greater than 20° (Science of Spectacles, 1977), the ideal spectacle wearing condition (the spectacle wearing distance 12 mm) is shown as the scientific basis based on the findings. When performing the calculation based on these conditions, the distance portion of the lens can cover the effective visual field if $9 \leq Oh$ is satisfied. However, in reality, the spectacle wearing distance takes various values depending on the structure of the face, and is not limited to this value.

It is also possible to notify the spectacle store of the fact that the effective range of the distance portion underruns the ideal value with the frame selected by the customer based on $\Delta Oh$.

$$th = Fh + SPh + Nh \quad (1)$$

$$\Delta E = Indih - th \quad (2)$$

$$0 \leq \Delta E \leq 2 \quad (3)$$

$$Oh = Bh - FEPh \quad (4)$$

$$9 \leq Oh \quad (5)$$

$$\Delta Oh = Oh - Oh\_r \quad (6)$$

The lens selector 130 selects the most suitable product from the lens type profile storage section 102 based on the various parameters ($\Delta E$) obtained by the operation of the parameter operation section 120, the distance eye point height Fh, and the basic information of the products previously stored in the lens type profile storage section 102.

Here, there are three groups, namely the lenses stressing distance-near vision, stressing intermediate-near vision, and stressing near-near vision, in the spectacle lenses using the progressive-power lens, and the difference therebetween is the length of the amount of lateral gaze. Specifically, the spectacle lenses stressing distance-near vision are used for viewing both of a landscape in the distance and a document located near, and the amount of lateral gaze is larger than 6 mm, for example. Further, the spectacle lenses stressing intermediate-near vision are used for viewing both of a landscape in the intermediate distance and a document located near, and the amount of lateral gaze is larger than 4.5 mm and equal to or smaller than 6 mm, for example. Further, the spectacle lenses stressing near-near vision are used for viewing both of a document on the desk and a document at hand both located near, and the amount of lateral gaze is larger than 3.75 mm and equal to or smaller than 4.5 mm, for example. Since each of the three groups of lenses has a plurality of design types (A-, B-, and C-types), the lens selector 130 selects either one of the design types of A, B, and C of the spectacle lenses and another lens.

In a specific method of selecting the design type of the spectacle lens, whether or not the conditions of 0 mm$\leq \Delta E \leq$2 mm and 9 mm$\leq$Oh are satisfied in accordance with the value of the distance eye point height Fh of each of the spectacle groups. Specifically, in the spectacle lenses stressing distance-near vision having the one side distinct vision width Fw larger than 6 mm, whether or not the conditions of 0 mm$\leq \Delta E \leq$2 mm and 9 mm$\leq$Oh are satisfied is determined in each of the cases of 4 mm<Fh, 3 mm<Fh$\leq$4 mm, and 1 mm$\leq$Fh$\leq$3 mm, in the spectacle lenses stressing intermediate-near vision having the one side distinct vision width Fw equal to or smaller than 6 mm and larger than 4.5 mm, whether or not the conditions of 0 mm$\leq \Delta E \leq$2 mm and 9 mm$\leq$Oh are satisfied is determined in each of the cases of 3 mm<Fh, 2.5 mm<Fh$\leq$3 mm, and 0.8 mm$\leq$Fh$\leq$2.5 mm, in the spectacle lenses stressing near-near vision having the one side distinct vision width Fw equal to or larger than 3.75 mm and equal to or smaller than 4.5 mm, whether or not the conditions of 0 mm$\leq \Delta E \leq$2 mm and 9 mm$\leq$Oh are satisfied is determined in each of the cases of 2.5 mm<Fh, 2 mm<Fh$\leq$2.5 mm, and 0.5 mm$\leq$Fh$\leq$2 mm.

Further, various processes are performed on the spectacle lenses so as to comply with various parameters of the individual. Therefore, the lens selector 130 generates the process data for performing the process on the selected product so as to comply with the various parameters of the individual. As the process data, there can be cited, for example, a product name, the lens type, the frame PD, PD (R), PD (L), the LFP height, the edge thickness of the lens, the center thickness of the lens, the diameter of the lens, the base curve of the lens, the dioptric power measured by the lens meter (spherical power, cylindrical power, the cylinder axis, the prismatic power and the base setting, and additional power), and the color power of the lens.

It should be noted that the LFP height represents the relative height between the frame and the lens when setting the lens in the frame, and can be expressed by the distance between the frame setting reference point set on the lens and the reference position of the frame set on the frame. An arbitrary point on the lens can be used as the frame setting reference point, and in many cases, the starting point of the progressive shape or the geometric center of the lens are used. Further, as the reference position on the frame, the upper end or the lower end of the frame is used. The frame setting reference point on the lens and the reference position on the frame can be made up between the lens manufacturer and the person who performs the frame setting, and are therefore not limited thereto.

In the present embodiment, there is a case in which the distance between the frame setting reference point of the lens and the reference position of the frame varies depending on the design type of the lens thus selected. For example, it is the case in which the frame setting reference point is set to the starting point of the progressive shape and the reference position of the frame is set to the lower end of the frame. In this case, the LFP height corresponds to the value obtained by subtracting the distance eye point height Fh of the spectacle lens from the distance eye point height FEPh with respect to the frame selected by the customer.

By adding the LFP height in the selected design type to the process data, the setting of the lens 10 in the frame 20 can be performed correctly.

2-2. Configuration of Store Side Terminal

The store side terminal 200 is a terminal device provided with an arithmetic processing section, a storage section for storing a variety of data, an output section 210 such as a display for outputting a variety of screens, and an input section 220 such as a keyboard, and is networked to the manufacturer side terminal 100. As the store side terminal 200, a personal computer can be used, for example.

The storage section stores the various data input thereto, the analysis result data received from the manufacturer side terminal, and so on. Further, the storage section stores the analysis program for performing the process of making the wearing condition parameters of the spectacle lenses input and then transmitting the parameters to the manufacturer side terminal 100 and displaying the analysis result data received from the manufacturer side terminal 100, the distinct vision area program describing the process of simulating the distinct area based on the analysis result data, and so on. Further, the storage section stores the various forms for performing the screen display.

The arithmetic processing section is a central processing unit (CPU) for performing the operation and processing of the information, and performs the overall control of the store side terminal 200. The arithmetic processing section appropriately retrieves and then executes the various programs stored in the storage section to thereby realize the various functions in cooperation with the hardware (the storage section, the output section 210, and the input section 220).

As shown in FIG. 3, the arithmetic processing section is provided with a transmitter/receiver section 230 for transmitting/receiving the various data with the manufacturer side terminal 100, an analysis result processing section 240, and a simulation section 250.

The transmitter/receiver section 230 transmits the input information input in the input section 220 to the manufacturer side terminal 100, and receives the analysis result data transmitted from the manufacturer side terminal 100.

The analysis result processing section 240 retrieves and then executes the analysis program stored in the storage section. Specifically, the analysis result processing section 240 creates an analysis result screen 4 shown in FIG. 7 using the analysis result data received by the transmitter/receiver section 230, and then makes the output section 210 such as a display perform the screen display.

The simulation section 250 retrieves and then executes the distinct vision area program stored in the storage section. Specifically, the simulation section 250 simulates the distinct vision area in the case of viewing while wearing the spectacle lenses thus selected based on the analysis data, then creates the distinct vision area simulator screen 5 shown in FIG. 8, and then makes the output section 210 such as a display perform the screen display.

3. OPERATION OF SPECTACLE LENS SELECTION SYSTEM

Figure 4:
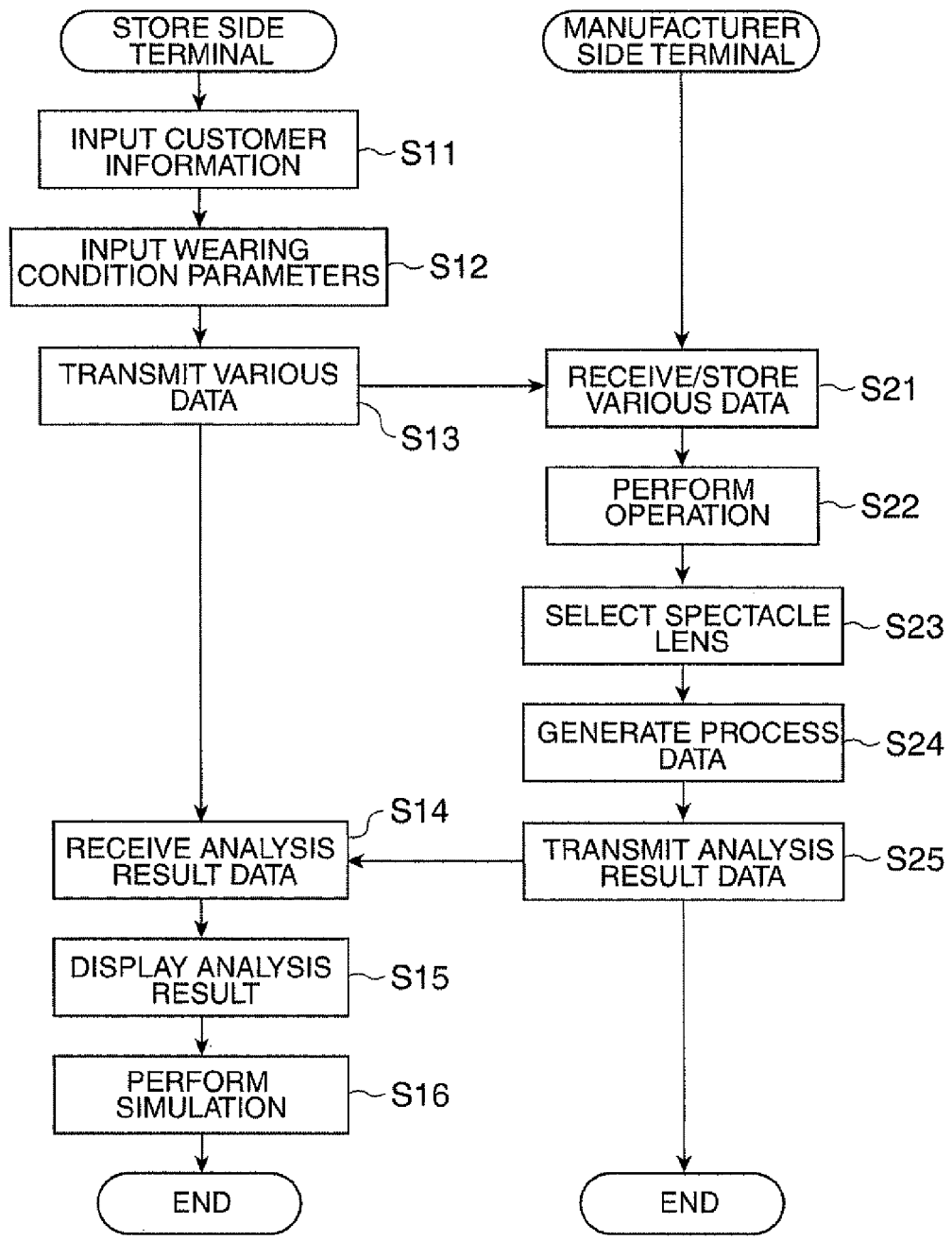
FIG. 4 is a flowchart showing an operation of the spectacle lens selection system according to the embodiment.

Then, the operation of the spectacle lens selection system 1 will be explained based on the flowchart shown in FIG. 4.

3-1. Measurement Method of Wearing Condition Parameters

Prior to making the spectacle lens selection system 1 operate, the wearing condition parameters of the spectacle of the individual are measured in the spectacle store. The measuring method is not particularly limited, and it is enough to perform the measurement with the measurement devices and the measurement method used commonly.

For example, the wearer wears the spectacle frame to be actually worn, the front and the side of the wearer in the distance vision state and the near vision state are shot by a digital camera, and then the shot images thus shot are analyzed, thereby making it possible to measure the various wearing condition parameters.

3-2. Operation of Spectacle Lens Selection System

When the measurement of the wearing condition parameters is completed, the clerk of the spectacle shop operates the input section 220 of the store side terminal 200 to thereby make the output section 210 display the customer information input screen. On the customer information input screen, the basic information such as the name, age, gender of the customer, and the name of the store is arranged to be input, and the clerk inputs the information (S11) along the customer information input screen.

Subsequently, the input screen for making it possible to input the spectacle information (the frame data, the fitting data, and the prescription data, which can be obtained by the optometry, of the customer) is displayed. As shown in FIG. 5, on the input screen 3, there can be input as the prescription data, the right and left spherical powers (S; unit: D), the right and left cylindrical power (C; unit: D), the angles of the right and left cylinder axis (Ax; unit: degree), the base settings of the right and left prisms, the pupillary distance in the distance vision (distance PD; unit: mm), the additional power (unit: D), and so on. Further, it is arranged that there can be input as the frame data the manufacturer's name of the spectacle frame, the type (model name), the lens shape width (unit: mm), the nose width (unit: mm), the vertical width (unit: mm), the temple length (unit: mm), and so on. Further, as the fitting data, there can be input the wearing distance (unit: mm), the forward tilt angle (unit: degree), the amount of downward rolling of the eyes (unit: mm), the amount of lateral gaze (unit: mm), the distance EP height (unit: mm), the dominant eye (right or left), and so on. It should be noted that the distance EP (eye point) is the distance from the lower side of the lens to the distance EP. Further, it is also possible to select the group of stressing distance-near vision, stressing intermediate-near vision, or stressing near-near vision in accordance with the purpose of use of the spectacle lens. In the case of the group stressing distance-near vision, the near purpose distance (unit: cm) can be input, and in the case of the group stressing intermediate-near vision or the case of the group stressing near-near vision, the distance purpose distance (unit: cm) and the near purpose distance (unit: cm) can be input.

The prescription data obtained by the optometry, the frame data selected by the customer, and the fitting data (the wearing condition parameters) obtained by measurement are input (S12) along the input screen 3 described above.

When holding down the transmission button 31 not shown by operating the input section 220 after inputting the various data on the input screen 3, the transmitter/receiver section 230 transmits the customer information and the spectacle information input in the steps S11 and S12 to the manufacturer side terminal 100 (S13).

The manufacturer side terminal 100 receives (S21) the customer information and the spectacle information, which has been transmitted from the store side terminal 200, with the transmitter/receiver section 110. Further, the transmitter/receiver section 110 stores the customer information and the spectacle information thus received into the spectacle information storage section 101.

Subsequently, the parameter operation section 120 obtains the progressive band length SPh based on the amount of downward rolling of the eyes Indih out of the spectacle information thus received. Further, the parameter operation section 120 calculates $\Delta E$ using the formulas (1), (2) described above based on the amount of downward rolling of the eyes Indih, the distance eye point height Fh, the progressive band length SPh, and the near portion height Nh. Further, the parameter operation section 120 calculates the upper frame height Oh in the frame selected by the customer using the formula (4) described above based on the vertical width Bh of the frame selected by the customer, and the distance eye point height FEPh with respect to the frame selected by the customer. Further, the parameter operation section 120 calculates (S22) $\Delta Oh$ using the formula (6) described above based on the upper frame height Oh and Oh_r determined previously.

Subsequently, the lens selector 130 selects (S23) the most appropriate spectacle lenses based on the operation result in the step S22. The spectacle lenses include the groups stressing distance-near vision, stressing intermediate-near vision, and stressing near-near vision, and further, each of the groups includes a plurality of design types of products. As the selection procedure, firstly, either one of the groups of the spectacle lenses stressing distance-near vision, stressing intermediate-near vision, and stressing near-near vision is selected, and further, the most suitable design type and the progressive band length are selected in that group.

The group of the spectacle lenses can be selected based on the amount of lateral gaze of the wearer. For example, the spectacle lenses stressing distance-near vision are applied to the person having a large amount (e.g., equal to or greater than 6 mm) of lateral gaze, the spectacle lenses stressing intermediate-near vision are applied to the person having an intermediate amount of lateral gaze, and the spectacle lenses stressing near-near vision are applied to the person having a small amount of lateral gaze. Further, it is also possible to make the selection taking the purpose of use of the wearer into consideration.

Figure 6:
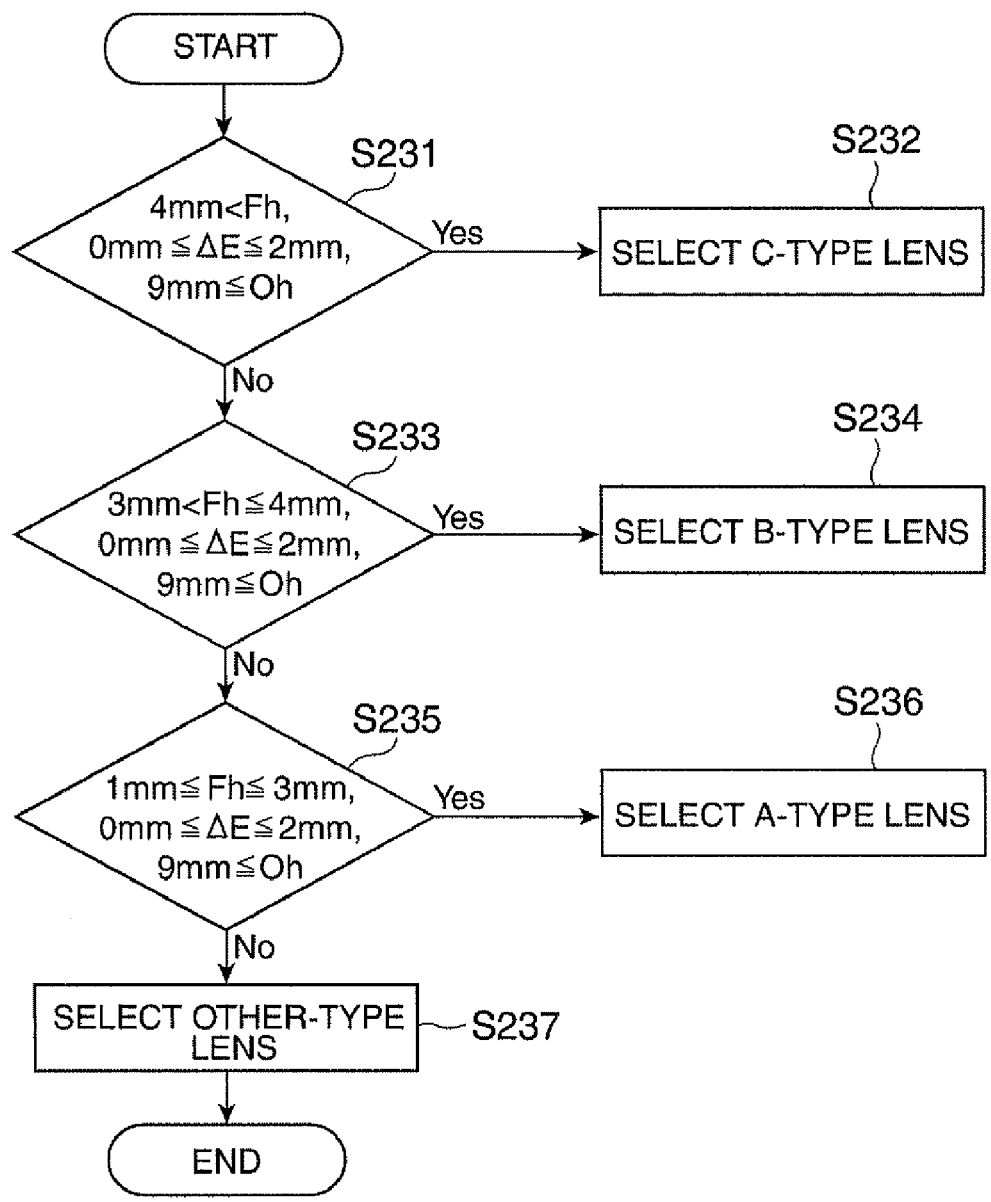
FIG. 6 is a flow chart showing the procedure of the manufacturer terminal for selecting a spectacle lens in the embodiment.

Regarding the design type, the most appropriate design type is selected using the following determination based on $\Delta E$ and the eye point height Fh of the distance portion area 11. Further, regarding the upper frame height Oh of the frame selected by the customer, whether or not the frame vertical width is appropriate and the amount of shortage are obtained using the following determination based on the vertical width Bh of the frame selected by the customer and the distance eye point height FEPh by the frame selected by the customer. The specific selection method of the design type will be explained based on the flowchart shown in FIG. 6. FIG. 6 is a flowchart with respect to the spectacle lens stressing distance-near vision. Although there are spectacle lenses stressing intermediate-near vision, and stressing near-near vision besides the spectacle lenses stressing distance-near vision, and the criterion for determination in each of the steps is different, in the present embodiment, the spectacle lenses stressing distance-near vision will be explained.

The lens selector 130 determines (S231) whether or not the conditions of 4 mm<Fh, 0 mm$\leq \Delta E \leq$2 mm, and 9 mm$\leq$Oh are satisfied, and selects (S232) the C-type spectacle lenses if the conditions are satisfied, or determines (S233) whether or not the B-type spectacle lenses satisfy the conditions if the C-type lenses fail to satisfy the conditions. The selection conditions of the B-type lenses are 3 mm<Fh$\leq$4 mm, 0 mm$\leq \Delta E \leq$2 mm, and 9 mm$\leq$Oh, and the lens selector 130 selects (S234) the B-type spectacle lenses if the conditions are satisfied, or determines (S235) whether or not the A-type lenses satisfy the conditions if the B-type spectacle lenses fail to satisfy the conditions. The selection conditions of the A-type lenses are 1 mm<Fh$\leq$3 mm, 0 mm$\leq \Delta E \leq$2 mm, and 9 mm$\leq$Oh, and the lens selector 130 selects (S236) the A-type spectacle lenses if the conditions are satisfied, or selects (S237) other lenses than the A-type through the C-type lenses if the A-type spectacle lenses fail to satisfy the conditions.

Further, the lens selector 130 obtains the product information related to the selected spectacle lenses and the selected design type from the spectacle information storage section 101 to thereby generate (S24) the process data with respect to the product information thus obtained. The process data is appropriately adjusted so that the various parameters of the product thus obtained comply with the wearing condition parameters thus received.

Further, the transmitter/receiver section 110 combines the product information related to the spectacle lenses and the design type thus selected and the process data with respect to the spectacle lenses to thereby obtain the analysis result data, and then transmits (S25) it to the store side terminal 200.

The store side terminal 200 receives (S14) the analysis result data, which has been transmitted from the manufacturer side terminal 100, with the transmitter/receiver section 230.

Figure 7:
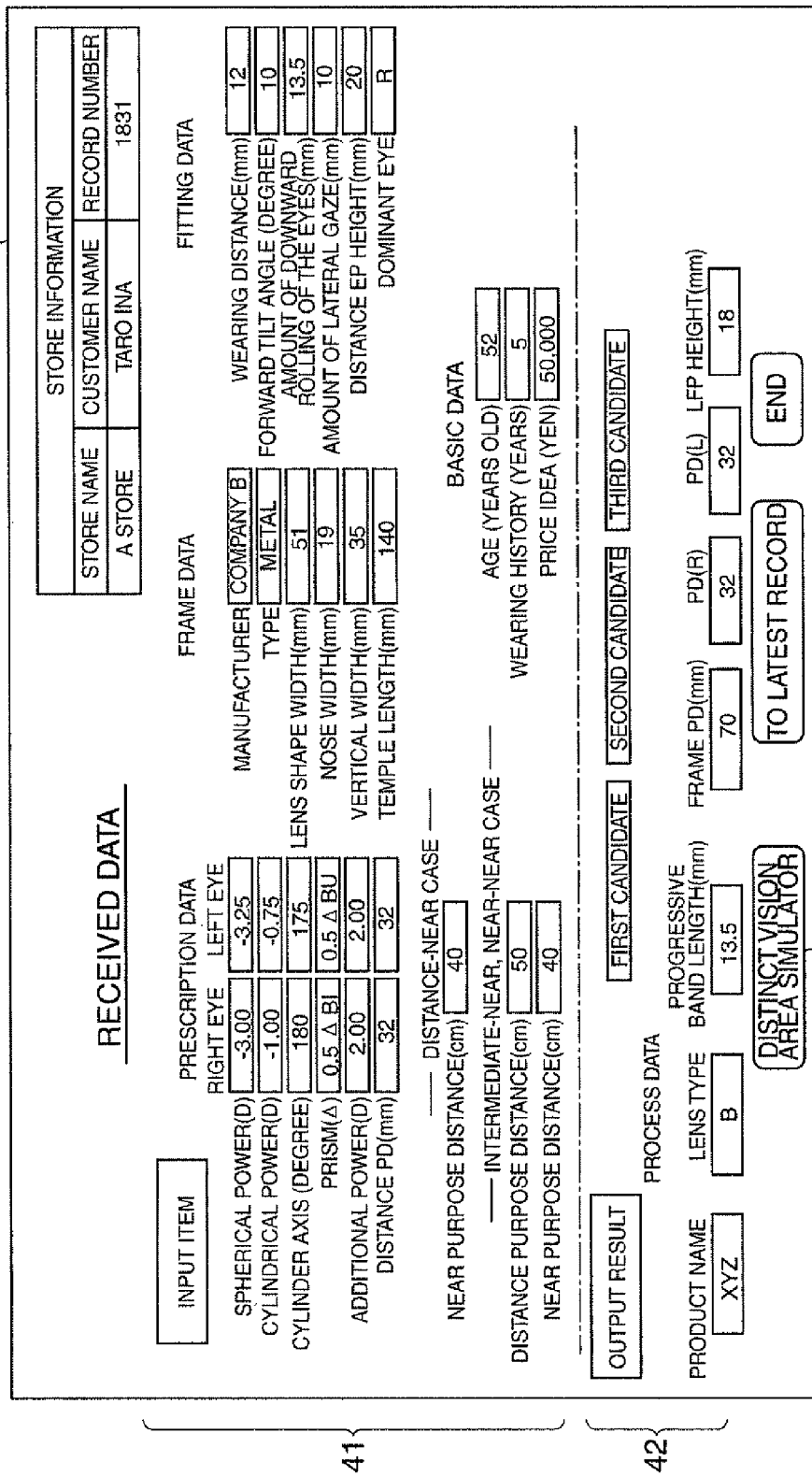
FIG. 7 is a schematic diagram of an analysis result screen displayed on the output section of the store terminal in the embodiment.

Further, the analysis result processing section 240 creates an analysis result screen 4 shown in FIG. 7 using the analysis result data received, and then makes (S15) the output section 210 perform the screen display. The analysis result screen 4 is composed of an input item display section 41 displaying the items input on the input screen 3 in the step S12, and an analysis result display section 42 displaying the analysis result received from the manufacturer side terminal 100. The product information of the spectacle lens most suitable for the customer is displayed on the analysis result display section 42. As specific product information, there can be cited the product name, the lens type, and the progressive band length, and if the process data is received simultaneously, the values of the frame PD, PD (R), PD (L), and the LFP height are displayed. Further, as the product information, two or more candidates can be displayed, and the display can be switched by the respective buttons.

Figure 8:
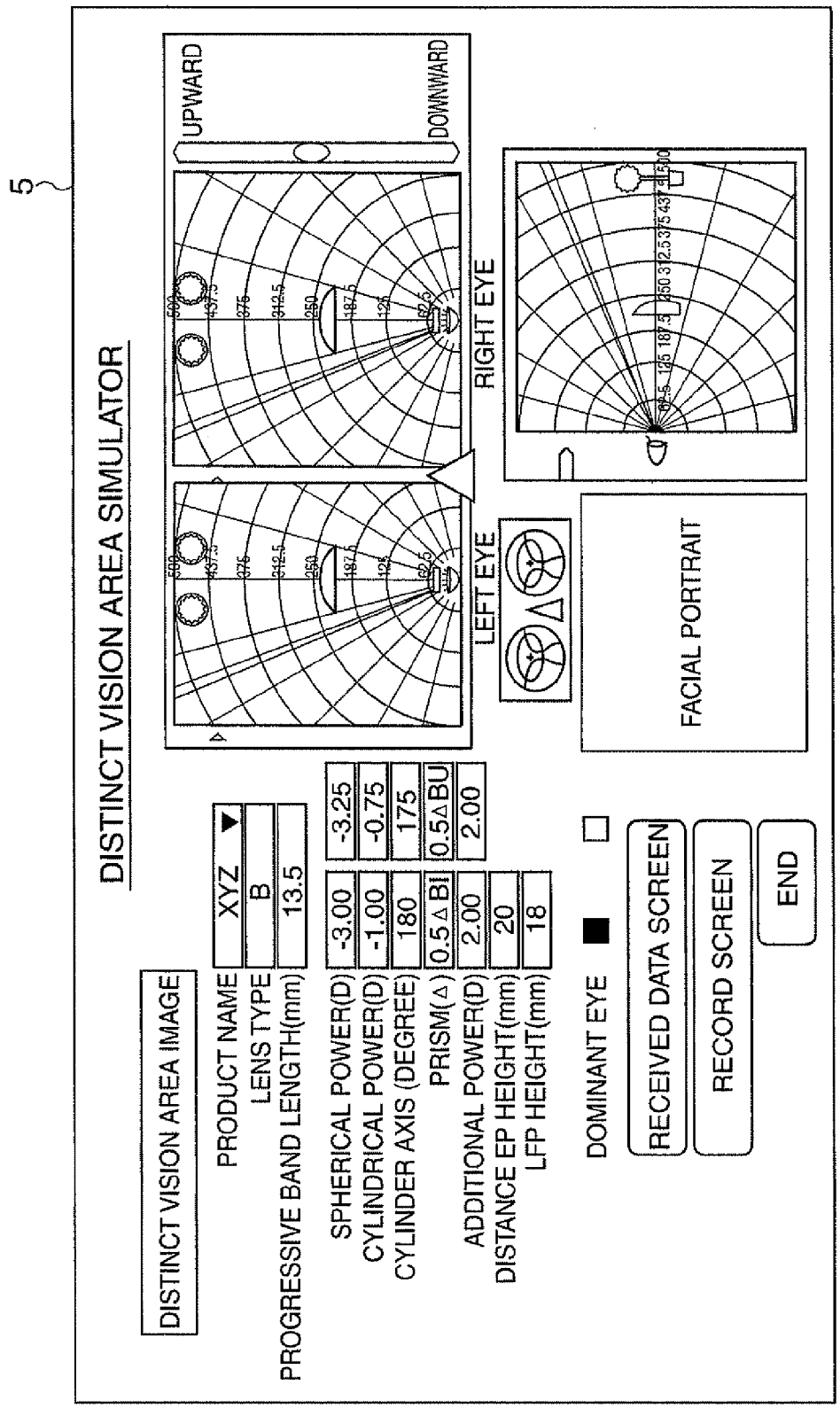
FIG. 8 is a schematic diagram of a distinct vision region simulator screen displayed on the output section of the store terminal in the embodiment.

Subsequently, when operating the input section 220 to hold down the distinct vision area simulation button 43 in the analysis result screen 4, the simulation section 250 creates the distinct vision area simulator screen 5 shown in FIG. 8, and then performs (S16) the screen display on the output section 210. The distinct vision area denotes the range in which the clear vision can be provided, and in the distinct vision area simulator screen 5 shown in FIG. 8, the distinct vision area when wearing the selected spectacle lenses in accordance with the analysis result is simulated. It should be noted that if the process data exists, the simulation is performed on the spectacle lenses in the condition of performing the process on the selected product.

4. FUNCTIONS AND ADVANTAGES OF EMBODIMENT

In the embodiment described above, the following functions and advantages can be exerted.

The clerk of the spectacle store measures the wearing condition parameters of the customer, and then uses the spectacle lens selection system 1. Specifically, the spectacle lens selection system 1 transmits the wearing condition parameters of the customer input to the store side terminal 200 in accordance with the operation of the input section 220 by the clerk of the spectacle store to the manufacturer side terminal 100 with the transmitter/receiver section 230. It should be noted that the wearing condition parameters include the optometry prescription data, the frame data, and the fitting data, and the fitting data includes the amount of downward rolling of the eyes and the amount of lateral gaze. Further, in the manufacturer side terminal 100, the transmitter/receiver section 110 receives the wearing condition parameters, the parameter operation section 120 performs the analysis (operation) using the wearing condition parameters, and the lens selector 130 selects the product with the spectacle lenses most suitable for the customer. Further, the transmitter/receiver 110 transmits the analysis data (the basic information of the selected product) to the store side terminal 200. The store side terminal 200 makes the output section 210 display the analysis result data thus received on the screen, and at the same time presents the distinct vision area simulator performed based on the analysis result data to the customer.

In order to perform the optimization of the progressive-power lens, the amount of downward rolling of the eyes and the amount of lateral gaze become important. Since in the embodiment described above the amount of downward rolling of the eyes and the amount of lateral gaze are transmitted from the store side terminal 200, the manufacturer side terminal 100 can obtain the progressive band length from the amount of downward rolling of the eyes, and can obtain the size of the distance portion area 11 from the amount of lateral gaze. Therefore, it is possible to select the product most suitable for the customer based on these parameters and the product information the lens manufacturer has.

Further, the product information of the spectacle lens selected in the manufacturer side terminal 100 is transmitted to the store side terminal 200, and is displayed on the output section 210 of the store side terminal 200. Therefore, in the spectacle store, the information of the spectacle lens more comfortable to the customer can promptly be provided. The spectacle lenses analyzed by the lens manufacturer (the manufacturer side terminal 100), and selected based on the analysis result can easily satisfy the customer, and therefore, enhancement of the communication can be achieved.

In particular, since the simulation section 250 simulates the distinct vision area when wearing the spectacle lenses selected by the analysis and presents the result to the customer, the customer can easily check the vision in advance of manufacture of the spectacle lenses.

As described above, since the cooperation between the lens manufacturer and the spectacle store becomes easy, it is possible to provide the customer with a wide variety of services.

5. MODIFIED EXAMPLES

It should be noted that the invention is not limited to the embodiment described above, but includes the modifications described below within the range where the advantage of the invention can be obtained.

For example, although in the embodiment described above, the optimization of the progressive-power lens is explained, it is also possible to perform optimization of single focus lenses or other functional lenses by transmitting the parameters necessary for such lenses from the store side terminal 200.

Further, although in the embodiment described above it is assumed that the wearing condition parameters are obtained by analyzing the shot images of the front and the side of the wearer in the measurement method of the wearing condition parameters, the measurement method is not limited thereto. Other methods such as a method of analyzing the eye movement path of the wearer using the eye movement measurement device can also be used.

Further, the calculation of the various parameters by the parameter operation section 120 and the selection procedure of the spectacle lenses by the lens selector 130 are not limited to the embodiment described above. Any method capable of selecting the most suitable spectacle lenses based on the various parameters can also be adopted.

What is claimed is:

1. A spectacle lens selection system comprising:
   a store side terminal installed in a store including a spectacle store; and
   a manufacturer side terminal installed in a lens manufacturer connected to the store side terminal via a network, the manufacturer side terminal includes;
      a profile storage section that stores a profile that represents characteristics of a progressive-power lens product in relation to the product,
      a lens selection section that selects a most suitable product from the profile storage section based on wearing condition parameters including a downward rolling length of eyes and a lateral gaze length of a spectacle wearer received from the store side terminal, and
      an analysis result transmission section that obtains an information related to the most suitable product selected from the profile storage section and transmits the information to the store side terminal as an analysis result; and
   the store side terminal includes;
      an input section that is capable of inputting customer information on the spectacle wearer and the wearing condition parameters,
      a data transmitter section that transmits the customer information input and the wearing condition parameters to the manufacturer side terminal, and
      an analysis result processing section that obtains the analysis result from the manufacturer side terminal and outputs the analysis result.

2. The spectacle lens selection system according to claim 1, wherein
   the store side terminal further includes a simulation section that simulates a vision of the spectacle wearer when the spectacle wearer wear the product selected based on the analysis result, and outputs a simulation result.

3. A spectacle lens selection method comprising:
   inputting a customer information on a spectacle wearer and a wearing condition parameters including a downward rolling length of eyes and a lateral gaze length to a store side terminal;
   transmitting the customer information and the wearing condition parameters from the store side terminal to a manufacturer side terminal;
   receiving the customer information and the wearing condition parameters by the manufacturer side terminal;
   selecting, by an arithmetic processing section of a computer, a most suitable product based on the wearing condition parameters; and
   transmitting an information related to the most suitable product to the store side terminal as an analysis result.

* * * * *